Figure 1:
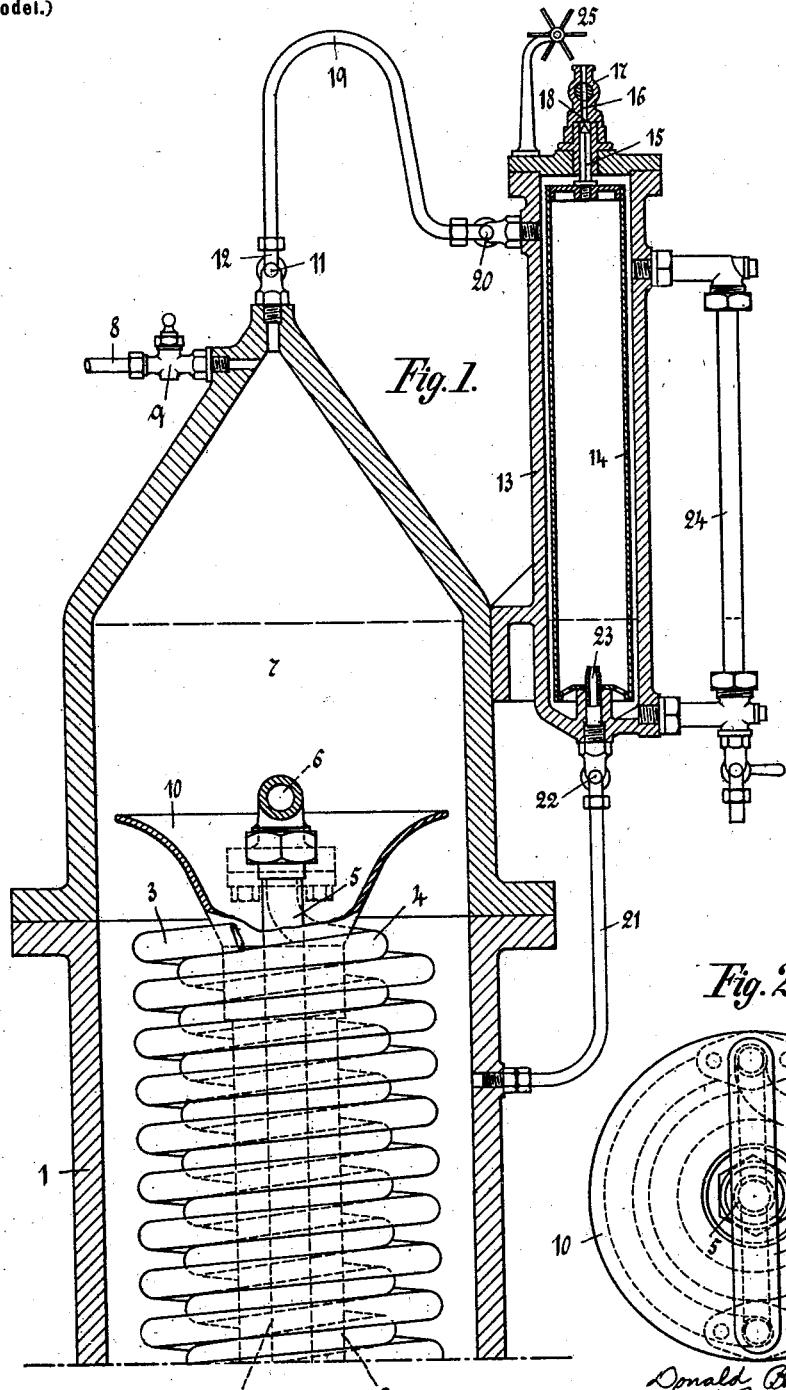

No. 700,068. Patented May 13, 1902.
D. B. MORISON.
FEED WATER CLEANER.
(Application filed June 10, 1901.)
(No Model.)

Inventor.
Donald Barns Morison.
by
Atty.

Witnesses:

UNITED STATES PATENT OFFICE.

DONALD BARNS MORISON, OF HARTLEPOOL, ENGLAND.

FEED-WATER CLEANER.

SPECIFICATION forming part of Letters Patent No. 700,068, dated May 13, 1902.

Application filed June 10, 1901. Serial No. 63,916. (No model.)

*To all whom it may concern:*

Be it known that I, DONALD BARNS MORISON, a subject of the King of Great Britain and Ireland, and a resident of Hartlepool, in the county of Durham, England, have invented certain new and useful Improvements in Feed-Water Cleaners, of which the following is a specification.

The present invention relates to an improved device or apparatus for the separation from water to be fed to steam-boilers of portions of any contained air and oil or other impurities.

The object of my invention is to procure a feed-water cleaner which is exceedingly simple in construction and reliable and efficient in use and which can be readily fitted to the feed-water pipe or, preferably, combined with a feed-water heater.

With this purpose in view my improved feed-cleaner consists of a separating or cleaning vessel or chamber into which after being heated the feed-water is caused, by means of suitable guide-plates or the like, to pass upwardly into the said vessel or chamber with a velocity greater than the downflow of the discharge, with the object of giving the stream of entering water by the said throttling a tendency not to flow down directly to the outlet of the said separating-chamber, but to travel to the water-level in this chamber in a manner to promote the separation of air and oil or other impurities from the water on whose surface the separated oil, &c., will float, while the released air will accumulate in the upper part of the separating-chamber. The upper part of this separating chamber or vessel is made of a form which slowly diminishes in sectional area (for instance, it may be of a long conical form or a long dome terminating in a cylindrical pipe or tube) toward the top, where outlets under control of cocks or valves are provided, through which at desired intervals air and oil, respectively, are discharged. In some cases the air may be discharged automatically by means of a float-controlled mechanism, which forms also an important feature and part of my present invention.

One object of the form of slowly-diminishing area toward the top and of a minimum area at the top is that after all the air has been discharged from the separating vessel or chamber and the air-discharge valve closed further accumulated air may be quickly concentrated, and so form a buffer or cushion, which will minimize shock due to the working of the feed-pumps.

With the described formation of the upper part of the vessel concentration of a column of air may be effected more rapidly than with a hemispherical or approximately hemispherical form. Furthermore, while an accumulation of air will depress the water-level, and so give an increasing surface area for the accumulation of oil, the discharge of the air will cause the water-level to rise and gradually decrease the surface area, and thus concentrate the oil or other floating impurities, so that they may be ultimately discharged with the least loss of feed-water.

In order that my invention may be more fully understood, I shall now proceed to describe the same in detail. Reference is taken for that purpose to the accompanying sheet of drawings, in which I have shown, by—

Figure 2:
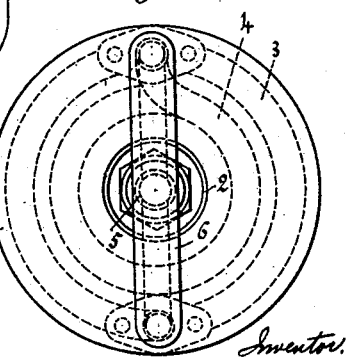

Figure 1, a vertical central section of a preferred constructional form of my improved feed-water cleaner in combination with a feed-water heater and provided with an automatic air-discharge mechanism, (of the feed-water heater is only shown as much as is necessary for a clear understanding of the present invention,) and by Fig. 2 a plan view of the funnel-shaped water discharge or outlet and of the upper part of the heating-coils of the feed-heater.

Similar numerals refer to similar parts throughout both views.

The feed-water heater shown is of the surface type and consists of a water-heating vessel or chamber 1, preferably cylindrical, into which the feed-water is passed at or near the bottom and is discharged at the top through a central discharge-tube 2. The heating-coils 3 and 4 being in communication with the steam-inlet tube 5 by means of a suitable connecting piece or casting 6 are arranged so that they surround the central water-discharge tube 2, through the interior of which the steam-inlet pipe 5, having a smaller diameter than the said tube 2, is passing. The separating vessel or chamber 7, connected with or attached to the upper end of the heating chamber or vessel 1, is in the form of a cylindrical extension of the heater, terminating in a hollow cone, near the apex of which is an outlet-pipe 8, provided with a cock 9, through which oil or other impurities may be discharged, as will be described later on.

Within the separating vessel 7 is fitted in any suitable manner a hollow bell-mouthed or funnel-shaped casting 10, which is in connection at its lower end, having the smaller diameter, with the central tube 2, through which the feed-water is discharged. In consequence of the flaring upper end of the casting 10 the area past the upper edge or rim of this casting—that is to say, the passage between this upper edge or rim and the wall of the heating vessel 1—is reduced, so that the velocity of the rising or upwardly-traveling feed-water is necessarily increased, while a corresponding decrease is effected by the increased area of the outlet formed by the said bell-mouthed casting 10.

The air released accumulates in the separating vessel 7, lowering the water-level and forming a water-surface upon which the released oil, &c., floats, the downward velocity of the water being so reduced by the inverted-cone shape of the outlet 10 that any tendency there may be for the oil to be carried down the center outlet-pipe 2 will be neutralized by the buoyancy of the oil and the surface tension between the liquid and the oil.

The oil may be discharged at intervals by means of the cock 9, above referred to. The air is discharged, by means of a cock 11, through a small discharge-pipe 12, situated in any convenient position at the remotest end of the separating vessel 7. The air-discharge may be effected automatically by means of a float-controlled mechanism. The usual way of doing this is to have a float-controlled valve within the heating vessel itself, the action being that as the air accumulates the water-level falls and the float-controlled valve opens, thus allowing the air to escape. In my improved mechanism, however, the float is of the open-ended type in a separate vessel or casing, which may be isolated from the feed-heater, so that the float and valve may be examined, cleaned, and the float recharged with air at a pressure equal to the pressure within the heater when desired and without interfering with the working of the feed-heater. For carrying out this method of construction I place within a vertically-arranged cylindrical casing 13 an inverted open-ended float 14, the upper or closed end of which terminates in or carries a suitable valve 15. The cover of the casing 13 is provided with an air-outlet 16, which is fitted with an air-cock 17 and which also holds the seat 18 of the air-valve 15. The upper end of the casing 13 is connected with the air outlet or discharge pipe 12 of the separating vessel 7 by means of a connecting-pipe 19, provided with a cock 20. The lower end of the casing 13 is connected with the heating-chamber 1 by a connecting-pipe 21, provided with a cock 22.

This lower connection 21 terminates in an internal pipe 23, which projects into the float 14, so that the volume of air necessary for its buoyancy may be maintained in the float. The connection 19 extends upward beyond the highest level of the water in the feed-heater and separating vessel, respectively, so that when the oil or scum is discharged through the cock 9 there will still be sufficient air within the casing 13 and the connection 19 to effect a cushioning action on the pumps by which the water may be supplied to the heater. The casing 13 is preferably fitted with a gage-glass 24 for indicating the water-level.

In order to examine or clean the float or its valve, the casing 13 is isolated by closing the connections 19 and 21, and in order to recharge the float 14 with air at a pressure equal to the pressure in the feed-heater the connection 19 is first opened, and subsequently the water is admitted through the bottom connection 21. This apparatus for recharging the open float at will is of great practical value, as when an open float within the feed-heater or indirect or uncontrollable connection therewith becomes flooded it cannot be recharged with air without interfering with the working of the heater.

In order to observe from a distance whether air is being discharged, I fix to the casing 13, near the air discharge or outlet 16, a device 25, adapted to be actuated by the escaping air, so that its movement or position respectively indicates that air is being discharged.

Having fully described my invention, what I claim, and desire to secure by Letters Patent, is—

1. In a feed-water cleaner, a suitable chamber, heater-coils therein, a discharge-pipe extending through the center of said coils, a flaring mouthpiece on said pipe to form a restricted passage between it and the walls of the chamber, and a contracted top on the heater for collecting oil and air separated from the water, means for discharging the oil and means for automatically discharging air, substantially as and for the purpose set forth.

2. In a feed-water cleaner, a suitable chamber, having a contracted top, means for heating the water, a float-chamber communicating with the first-mentioned chamber below the water-level and with the air-space formed in the contracted top, an open-ended float in the float-chamber, a valve controlling an air-outlet operated by the float, substantially as and for the purpose set forth.

3. In a feed-water cleaner, a suitable chamber having a conical top, means for heating the water therein, a float-chamber, an open-ended float therein, a pipe connecting the lower end of the float-chamber with the first-mentioned chamber below the normal water-level and projecting into the end of said float; a pipe connecting the apex of the conical top of the first-mentioned chamber with the upper part of the float-chamber, an air-outlet for the float-chamber, a valve carried by the float controlling the air-outlet, means for drawing off the oil and means for visibly indicating the flow of air from the float-chamber, substantially as and for the purpose set forth.

4. In a feed-water cleaner, a suitable chamber having a conical top, means in the chamber for heating the feed-water, a float-chamber, an open-ended float therein, a pipe connecting the lower end of the float-chamber to the first-mentioned chamber below normal water-level, and projecting into the open end of the float, a pipe connecting the apex of the conical top with the upper end of the float-chamber, stop-cocks in each of said pipes whereby the float-chamber can be cut off from the first-mentioned one and the float proportionally loaded to the working pressure in the first-mentioned chamber, an air-outlet a needle-valve carried by the float controlling the air-outlet, and a revolving vane over the air-outlet to visibly indicate a current of air from the float-chamber, substantially as and for the purpose set forth.

5. In a feed-water cleaner, a suitable heating-chamber having a conical top, a float-chamber communicating with the heating-chamber below water-level therein and with the air-space in the conical top, a float in said chamber, a valve controlling air-outlet operated by the float and an oil-outlet in the conical top, substantially as and for the purpose set forth.

6. In a feed-water cleaner, a suitable heating-chamber having a conical top, a float-chamber, a pipe connecting the latter with the heating-chamber below normal water-level therein and one connecting its upper end with the conical top, an open-ended float in said chamber, the first-mentioned pipe entering the open end of the float, a needle-valve connected to the float and controlling an air-outlet, a vane adapted to be moved by the current of air issuing from said air-outlet, a water-level indicator connected to the float and means for withdrawing oil from the surface of the water in the conical top, and means within the chamber for throttling the feed-water near the top of the chamber, substantially as and for the purpose set forth.

DONALD BARNS MORISON.

Witnesses:
DANIEL MORISON,
WILLIAM ELLIS.